(12) United States Patent
Varden

(10) Patent No.: US 7,927,052 B1
(45) Date of Patent: Apr. 19, 2011

(54) LOCKING AXLE NUT

(76) Inventor: Arnold Varden, Barrie (CA)

( * ) Notice: Subject to any disclaimer, the term of this patent is extended or adjusted under 35 U.S.C. 154(b) by 0 days.

(21) Appl. No.: 12/606,042

(22) Filed: Oct. 26, 2009

(51) Int. Cl.
*F16B 39/04* (2006.01)

(52) U.S. Cl. .................. 411/221; 411/197; 411/204

(58) Field of Classification Search .............. 411/204, 411/197, 122, 221, 533, 976
See application file for complete search history.

(56) References Cited

U.S. PATENT DOCUMENTS

| | | | | |
|---|---|---|---|---|
| 580,340 | A * | 4/1897 | Buell | 411/198 |
| 976,928 | A * | 11/1910 | Salisbury | 411/221 |
| 1,197,429 | A * | 9/1916 | Barnard | 411/209 |
| 1,431,459 | A * | 10/1922 | Hardie | 411/221 |
| 1,440,938 | A * | 1/1923 | Sieroslawski | 411/221 |
| 1,491,163 | A * | 4/1924 | Osenkowski | 411/221 |
| 1,613,493 | A * | 1/1927 | Turner et al. | 411/225 |
| 1,685,120 | A * | 9/1928 | Carns | 411/201 |
| 3,022,809 | A * | 2/1962 | Kottsieper | 411/197 |
| 3,208,493 | A * | 9/1965 | Holmes | 411/322 |
| 3,581,609 | A * | 6/1971 | Greenwood | 81/124.7 |
| 3,762,455 | A * | 10/1973 | Anderson, Jr. | 411/190 |
| 3,844,323 | A * | 10/1974 | Anderson, Jr. | 411/190 |
| 3,976,816 | A * | 8/1976 | Fadgen et al. | 427/97.2 |
| 4,812,094 | A * | 3/1989 | Grube | 411/134 |
| 5,022,875 | A * | 6/1991 | Karls | 440/49 |
| 5,221,168 | A * | 6/1993 | Kasai | 411/124 |
| 5,618,143 | A * | 4/1997 | Cronin et al. | 411/220 |
| 5,772,373 | A * | 6/1998 | Cronin et al. | 411/120 |
| 5,967,724 | A * | 10/1999 | Terry | 411/149 |
| 6,010,290 | A * | 1/2000 | Slesinski et al. | 411/226 |
| 6,224,167 | B1 * | 5/2001 | Riley | 301/126 |
| 6,749,386 | B2 * | 6/2004 | Harris | 411/544 |
| 6,860,688 | B2 * | 3/2005 | Bushell et al. | 411/195 |
| 6,976,816 | B2 * | 12/2005 | Slesinski et al. | 411/122 |
| 7,303,367 | B2 * | 12/2007 | Rode | 411/246 |
| 2006/0008340 | A1 * | 1/2006 | Cox | 411/248 |
| 2007/0052287 | A1 * | 3/2007 | White et al. | 301/132 |
| 2007/0189876 | A1 * | 8/2007 | Harris | 411/161 |
| 2007/0211973 | A1 * | 9/2007 | Rode | 384/448 |

\* cited by examiner

*Primary Examiner* — Gary Estremsky

(74) *Attorney, Agent, or Firm* — Donald W. Meeker

(57) ABSTRACT

A castellated nut has 8 castellation slots in the outer wall. A circular locking insert has 25 long locking tabs radiating outwardly from the perimeter, an axle-engaging tongue protruding inwardly, and 9 smaller holding tabs which fit into an interior circular nut groove. All 25 locking tabs are bent at 90 degrees up from the circular locking insert and the axle slot-engaging tongue is bent down at 90 degrees. The locking insert is pressed into the nut and the small holding tabs are bent into the interior circular groove in the nut. The axle-engaging tongue is aligned with the axle shaft groove. The locking axle nut is threaded onto the axle shaft and tightened with the axle slot-engaging tongue sliding in the axle groove. One of the 25 locking tabs is bent into one of the 8 castellation slots.

3 Claims, 2 Drawing Sheets

LOCKING AXLE NUT

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to locking spindle nuts and particularly to a locking axle nut comprising a castellated nut with 8 castellation slots in the outer wall and a circular locking insert; the locking insert comprises 25 long locking tabs radiating outwardly from the perimeter, an axle-engaging tongue protruding inwardly, and 9 smaller holding tabs which fit into interior circular groove located just above the interior threaded portion of the nut; to install the locking insert, all 25 locking tabs are bent at 90 degrees up from the circular locking insert and the axle slot-engaging tongue is bent down at 90 degrees, the locking insert is pressed into the nut and the small holding tabs are bent into the interior circular groove in the nut, the axle-engaging tongue is then aligned with the groove or slot running along the length of the threaded axle shaft and the locking axle nut is then threaded onto the threaded axle shaft with the axle slot-engaging tongue sliding straight in the slot, once the locking axle nut is threaded on tightly, one of the 25 locking tabs is bent into one of the 8 castellation slots in the outer circular wall of the nut to lock the nut in place.

2. Description of Related Art including information disclosed under 37 CFR 1.97 and 1.98

In mounting a wheel on an axle, a locking device typically engages a keyway (slot) formed in the threaded portion of the axle so that the locking device is non-rotatable relative to the axle. One such device is a washer that is positioned between the bearings and the nut. After the nut is tightened to establish a desired pre-load on the bearings, the washer is deformed to engage a flat on the nut. This type of lock requires deformation of the washer to lock the nut.

Some spindle lock nuts use a tabbed washer which has a protrusion that engages the keyway of the spindle and a means of engaging the nut so that it is non-rotatable relative to the spindle. The means for engaging the nut is often undulations or score mark in the mating faces of the nut and the washer.

U.S. Patent Application 20060008340, published Jan. 12, 2006 by Cox, relates a wheel retention nut which includes a body having a front face and a rear face. A central bore with internal threads extends through the body. A first outer perimeter of a first diameter is positioned adjacent to the front face. The first outer perimeter defines a polygon adapted to receive a wrench. A second outer perimeter of a second diameter, which is larger than the first diameter, is positioned adjacent to the rear face. The second outer perimeter is sized to retain an eccentrically rotating wheel.

U.S. Patent Application 20070211973, published Sep. 13, 2007 by Rode, claims a method, apparatus, and nut for preloading a bearing. These methods and apparatus include preload monitoring devices whereby the mechanic can accurately monitor and regulate the preload on a bearing or bearing assembly. Aspects of the invention may also be used to adjust the endplay on a bearing or a bearing assembly. In one aspect, the preload on the bearing is transmitted through a housing having a fluid pressure that can be detected and monitored. An apparatus for precisely rotating a nut and a tool for precisely rotating a nut are also provided. A bearing retaining nut arrangement that permits the loading or evaluating of a bearing inner race is also provided. The bearing retaining nut arrangement includes a first load-setting nut, a lock washer, and a second jam nut that secures the arrangement to a shaft.

U.S. Patent Application 20070189876, published Aug. 16, 2007 by Harris, describes a locking fastener assembly comprising a nut and a washer. The nut and washer each have opposed load bearing surfaces which include a series of annularly extending, slightly inclined faces forming shallow undulations around each surface. The load bearing surface on the nut is generally spherically convex and the load bearing surface on the washer is generally spherically concave. The nut rotates as it is installed while the washer is prevented from rotating so that the undulating bearing surface on the nut slides over the undulating bearing surface on the washer against ever increasing resistance until the assembly is properly seated and the nut is effectively prevented from counter-rotating by interference between opposed, inclined faces. A concave clamping surface is formed on the outer end of the washer on a radially extending flange. The flange flexes when the assembly is installed and resiliently urges the washer against the nut.

U.S. Patent Application 20070052287, published Mar. 8, 2007 by White, discloses an axle spindle nut assembly for heavy-duty vehicles which secures a wheel end assembly on an axle spindle. The wheel end assembly includes outboard and inboard outboard bearings that are immovably mounted on the axle spindle, and a wheel hub which is rotatably mounting on the bearings. The spindle nut assembly includes a nut that threads onto an outboard end of the axle spindle, and is tightened against the outboard bearing to a selected torque level. The nut includes an outboard surface that is formed with a plurality of features. A washer is formed with a tab that engages a keyway of the axle spindle outboardly of the nut, and with a plurality of mating features that mechanically engage the features formed in the outboard surface of the nut to prevent substantial rotation of the nut after the nut has been tightened to the selected torque level.

U.S. Pat. No. 4,812,094, issued Mar. 14, 1989 to Grube, is for a locking fastener assembly for a threaded joint, such as axle bearings and the like, which is free spinning during tightening and removal and is positively held against rotation after installation. The assembly is engageable with an axially slotted male threaded member and includes a nut with female threads and a flange end. A retainer washer includes spaced fingers formed around the nut flange for rotatably supporting the washer at the flanged end of the nut. The washer includes a tab received in the slot of the male threaded member permitting the nut to move axially but not to rotate on the male threaded member. When the nut is engaged by a wrench, the wrench releases a flexible and resilient locking clip to permit the nut freely to rotate. After the assembly has been threaded onto the male threaded member, removal of the wrench frees the locking clip and a lock finger is received in a space between fingers of the retainer washer positively to prevent further rotation of the nut.

Two U.S. Pat. Nos. 3,762,455 issued Oct. 2, 1973 and 3,844,323 issued Oct. 29, 1974 to Anderson, Jr., provide a lock nut assembly in which a lock ring is adapted to be disposed and secured within an undercut cavity formed in the main body of the lock nut. The cavity is formed by a bottom transverse wall, a peripheral side wall extending upwardly therefrom, and an upper transverse wall. An annular set of teeth is mounted about the periphery of the lower portion of the sidewall adjacent the bottom wall. The space between the teeth and the upper transverse wall forms an undercut groove. The lock ring comprises a split ring having a central portion and a pair of leg portions extending outwardly therefrom. The central portion includes an inwardly extending key, an outwardly extending projection, and a pair of sectors having a plurality of teeth formed on the periphery thereof. The key is adapted to extend into a longitudinal keyway formed on an axle, shaft or like element to lock the ring against rotation with respect to the element. The projection is adapted to extend into the undercut groove while the teeth of the sectors are adapted to engage a portion of the teeth formed in the cavity to lock the ring against rotation with the nut. The central portion of the ring is secured in position by the legs of the lock ring extending into the undercut groove. Besides being biased outwardly to engage the sidewall of the undercut groove, the lock ring legs are biased in the axial direction to cause the upper surface of the legs to be biased against the upper wall and the central portion of the ring to be biased against the bottom surface of the cavity, thereby ensuring that the lock ring remains secure and in contact with the teeth in the cavity without becoming dislodged.

U.S. Pat. No. 3,581,609, issued Jun. 1, 1971 to Greenwood, shows a lock nut assembly including a nut having a threaded hole therein adapted for use with a bolt having a groove running at least part of the length of the thread thereon. The nut comprises a central recess which includes a plurality of inwardly extending serrations along a portion of the total depth of the recess. A lock ring having a plurality of serrations extending outwardly from the outer surface thereof is adapted to fit over the bolt and into the recess in the nut where the serrations on the lock ring mate with the serrations on the nut. The lock ring further includes an inwardly extending tongue which is positioned in the groove in the bolt so that the lock ring is axially moveable but not rotatable relative to the bolt, the nut being locked in place when the serrations thereon are in contact with the serrations on the lock ring. A special wrench is provided for separating the lock ring and nut so that the nut may be rotated relative to the bolt.

U.S. Pat. No. 7,303,367, issued Dec. 4, 2007 to Rode, claims a lock nut system which includes a molded nut having a plurality of teeth and a molded keeper having a plurality of keeper teeth engageable with the plurality of teeth to inhibit movement of the keeper relative to the nut when the plurality of teeth engages the plurality of keeper teeth. The keeper has a radially inner side configured to engage a shaft to inhibit rotational movement of the nut relative to the shaft when the plurality of teeth engages the plurality of keeper teeth.

Two U.S. Pat. Nos. 6,749,386 issued Jun. 15, 2004 and 7,226,259 issued Jun. 5, 2007 to Harris, describe a locking fastener assembly comprising a nut and a washer. The nut and washer each have opposed load bearing surfaces which include a series of annularly extending, slightly inclined faces forming shallow undulations around each surface. The load bearing surface on the nut is generally spherically convex and the load bearing surface on the washer is generally spherically concave. The nut rotates as it is installed while the washer is prevented from rotating so that the undulating bearing surface on the nut slides over the undulating bearing surface on the washer against ever increasing resistance until the assembly is properly seated and the nut is effectively prevented from counter-rotating by interference between opposed, inclined faces. A concave clamping surface is formed on the outer end of the washer on a radially extending flange. The flange flexes when the assembly is installed and resiliently urges the washer against the nut.

U.S. Pat. No. 3,208,493, issued Sep. 28, 1965 to Holmes, discloses a locknut and stud device which has a ring shaped nut retainer built into the nut. The ring shaped nut retainer has a plurality of projecting fingers which engage grooves in the shaft.

U.S. Pat. No. 6,224,167, issued May 1, 2001 to Riley, indicates a retaining assembly for an axle hub and bearing assembly. A hub assembly is supported by the spindle and is adapted to support the wheels. A bearing assembly is arranged adjacent to the threaded end portion and is interposed between the spindle and the hub assembly for permitting low friction rotation of the hub assembly relative to the spindle about the axis. An end nut is secured to the threaded end portion of the spindle for retaining the bearing assembly and the hub assembly on the spindle. A washer is interposed between said bearing assembly and the end nut wherein the washer secures the end nut to the spindle for preventing rotation of the end nut about the axis.

U.S. Pat. No. 6,976,816, issued Dec. 20, 2005 to Slesinski, puts forth a connection between a spindle and a bearing assembly to retain the bearing assembly on the spindle. A combination lock washer and spindle bearing assembly is provided to include a spindle, thrust washer, lock washer and nut in which the lock washer simultaneously locks the inner thrust washer and an outer spindle nut. According to the invention, the thrust washer, lock washer and nut may be oriented at any angle relative to one another allowing for infinite bearing adjustment positions.

U.S. Pat. No. 5,221,168, issued Jun. 22, 1993 to Kasai, concerns a device for fixing an external part, such as a ball and roller bearing, to a shaft by employing a washer and a nut. The washer is provided with a plurality of projecting engageable pawls on the outer periphery thereof and a projecting tongue piece on the inner periphery thereof. This tongue piece is inserted into an engageable groove formed in an externally threaded portion of the shaft. The nut has engageable grooves for receiving the engageable pawls of the washer, on the outer periphery thereof. This nut is threadably coupled onto the externally threaded portion of the shaft, thereby the ball and roller bearing is clamped interposing the washer between the bearing and the nut. The tongue piece of the washer is formed in such a manner that, out of the opposite ends in the circumferential direction of the tongue piece, at least the forward end in a direction of rotation of fastening the nut is positioned on the center line or thereabout of the engageable pawl. The shaft may be a hollow shaft.

U.S. Pat. No. 6,860,688, issued Mar. 1, 2005 to Bushell, illustrates a lockable nut system for use with threaded steel bar which includes a screw threaded nut for engagement with the threaded steel bar and a locking member which is slidably engageable with the bar. The locking member is adapted to resist rotation about the bar and is also axially engageable with the nut to prevent rotation of the nut. The locking member has one or more fingers to engage the nut with an end of the finger being displaced to engage the nut as a result of deformation of a finger actuating tab or a dished body of the locking member. The locking member may engage the bar by displacement of an end of at least one tongue as a result of deformation of a tongue actuating tab during compression between the nut and a second structure.

Two U.S. Pat. Nos. 5,618,143 issued Apr. 8, 1997 and 5,772,373 issued Jun. 30, 1998 to Cronin II, are for a spindle nut and a locking device for securing the nut in a rotative position on a spindle. An anti-rotation spring and a back up plate are mounted on the spindle in a non-rotative manner with the back up plate in abutment with the bearings that rotatively mount the hub to the spindle. The back up plate has multiple grooves aligned with and arranged to receive multiple resilient tabs on the periphery of the anti-rotation spring. The tabs of the anti-rotation spring are formed to project axially from the spring. A flange of the nut has multiple slots around its periphery that are sized to receive a tab of the anti-rotation spring. A tool having extending ears that fit in the slots of the nut is utilized to install the nut on the spindle. The extending ears prevent the tabs of the spring from entering a slot of the nut until the tool is removed. As the nut is rotated by the tool, the nut abuts the anti-rotation spring. The extending ears and the face of the flange in combination force the radial tabs of the spring further into the grooves of the back up plate. When the nut is torqued to the desired level, the tool is removed allowing a tab of the spring to enter a slot of the nut due to its resiliency to lock the nut in a rotative position. Should a tab of the spring not be in alignment with a slot of the nut, the nut need only rotate a few degrees to place one of the slots of the nut in alignment with a tab of the spring.

U.S. Pat. No. 6,010,290, issued Jan. 4, 2000 to Slesinski, provides a nut washer for a locking nut assembly. A single lock nut washer is formed of steel or other material to simultaneously lock an inner wheel bearing nut and an outer bearing nut secured to an axle spindle. An annular member has a plurality of outwardly extending tabs that bend over to engage the outer surface of the outer bearing nut to prevent rotation. An inwardly extending lug engages a groove in the axle spindle to prevent rotation of the washer. A plurality of circumferentially arranged bores are each adapted to receive a longitudinally extending pin of the inner bearing nut to prevent relative rotation. The lug is offset from the bores and is preferably oriented circumferentially intermediate one of the bores and a midpoint to an adjacent bore.

U.S. Pat. No. 976,928, issued Nov. 29, 1910 to Salisbury, shows a locking nut having grooves in the top thereof and a tabbed annular washer, the washer having two internally projecting tabs that engage slots in the shaft of a bolt and also having two externally extending tabs which fit with the grooves in the top of the nut.

U.S. Pat. No. 1,613,493, issued Jan. 4, 1927 to Turner, claims a nut lock comprising a bolt having a longitudinal groove in its threaded end, a nut for said bolt, a washer with a lug for engaging the groove in the bolt and a plurality of radial tongues which are received in castellated recesses in the top of the nut.

U.S. Pat. No. 1,440,938, issued Jan. 2, 1923 to Sieroslawski, describes a nut lock comprising a nut having T-shaped projections protruding from its top which form a plurality of slots. The device is provided with a locking split ring washer having an inwardly protruding tab for engagement with a slot in the shaft of a bolt and a plurality of radial tabs which are received in the slots created by the T-shaped projections.

U.S. Pat. No. 1,491,163, issued Apr. 22, 1924 to Osenkowski, discloses a nut lock with a locking washer having two inwardly protruding tabs for engagement with slots in the shaft of a bolt and two radial tabs which are received in castellated slots in the nut.

U.S. Pat. No. 1,431,459, issued Oct. 10, 1922 to Hardie, indicates a nut lock device which engages the slot on the shaft of a bolt, the device having a nut with a depressed center and castellations on its outer upper edge and a mating washer having two inwardly protruding tabs for engagement with slots in the shaft of a bolt and two radial tabs which are received in castellated slots in the nut.

U.S. Pat. No. 1,197,429, issued Sep. 5, 1916 to Barnard, shows a nut-lock comprising a bolt having a longitudinal groove in the shaft thereof, a nut threaded on the bolt, an external annular flange on said nut, an annular locking member inclosed by said flange, an inwardly directed tooth carried by said locking member engaged within said groove, a plurality of inwardly directed teeth on said flange, a tooth on said locking member arranged in radial line with the inwardly directed tooth and engaged between the first-mentioned teeth, and a cap removably secured upon said nut provided with an inwardly directed flange overlying and securing the locking member in position in the flange.

U.S. Pat. No. 580,340, issued Apr. 6, 1897 to Buell, provides a nut lock comprising a bolt having a pair of longitudinal grooves in the shaft thereof, a nut having a countersink in the outerface thereof adapted to receive and contain a washer in interlocking relation to the bolt and having slots on the face for the purpose of removing the washer, and an annular washer having two inwardly directed teeth for engaging the longitudinal grooves of the bolt and having a plurality of serrations around its outer perimeter which are adapted to form a binding friction upon the perimeter of said countersink to prevent rotation of the nut.

What is needed is a locking insert attached to a castellated nut to form a locking axle nut which can be easily installed and locked in place on an axle shaft.

BRIEF SUMMARY OF THE INVENTION

An object of the present invention is to provide a locking insert attached to a castellated nut to form a locking axle nut which can be easily installed and locked in place on an axle shaft.

In brief, the locking axle nut of the present invention has two parts, a nut and a locking insert which has 25 long locking tabs sticking out around perimeter and nine smaller holding tabs which fit into interior circular groove of the nut located just above the threaded portion on the inside of the outer wall that sticks out from the threaded portion around the perimeter of the nut with 8 slots in the outer wall.

To install the locking insert, all 25 locking tabs are bent at 90 degrees up from the circular locking insert and the tongue is bent down at 90 degrees. The locking insert is pressed into the nut and the small holding tabs are bent into the groove in the nut. The tongue is then aligned with the groove running along the length of the threaded axle shaft and the and the locking axle is then threaded onto the threaded axle shaft with the tongue sliding straight in the groove with the outer wall of the nut facing out. The locking insert moves straight onto the axle shaft while the nut is turned around it to thread the nut onto the threaded axle shaft.

Once the locking axle nut is threaded on tightly, one of the locking tabs is bent into one of the 8 slots in the outer circular wall of the nut to lock the nut in place. No matter where the nut has turned relative to the locking insert, one locking tab will always line up with the one of the 8 slots. The nut can no longer turn because the tongue of the locking insert is in the groove of the axle and the locking tab is in the slot of the nut and the nut cannot be turned to unthread.

BRIEF DESCRIPTION OF THE SEVERAL
VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
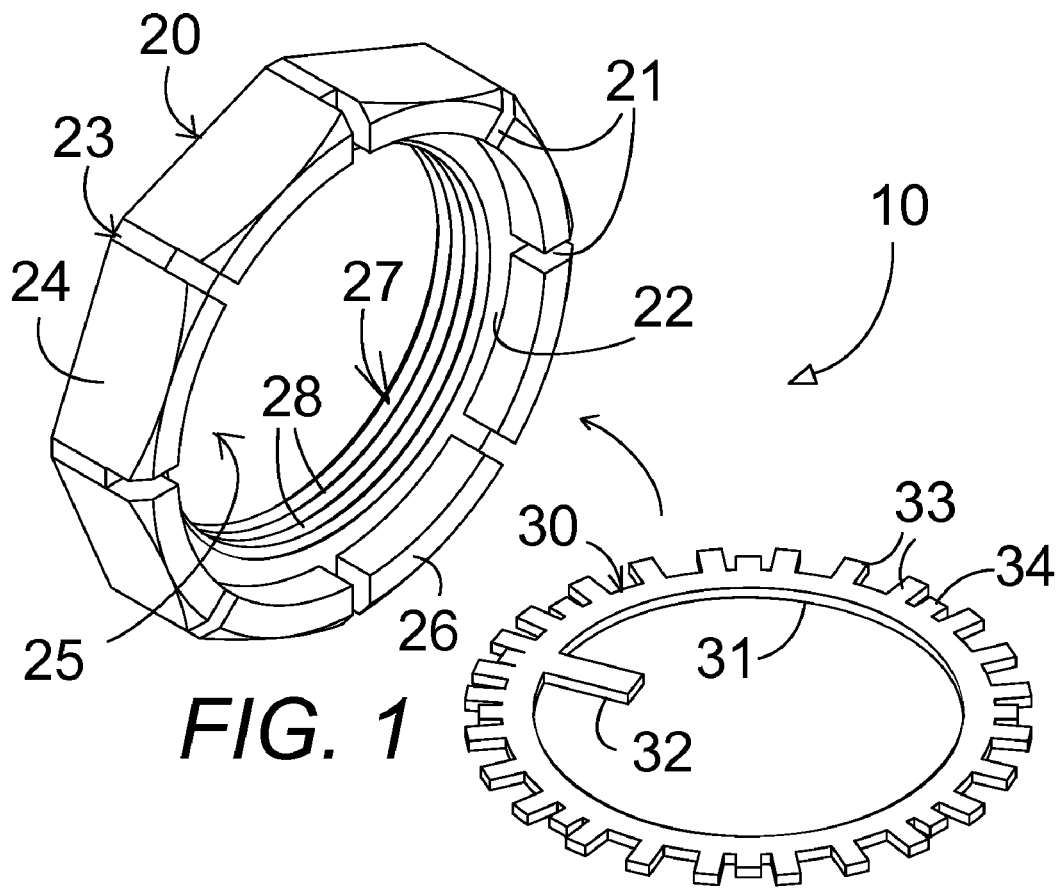
FIG. 1 is a perspective view of the two components of the present invention aligned to install the locking insert onto the castellated nut to form the locking axle nut.
Figure 2:
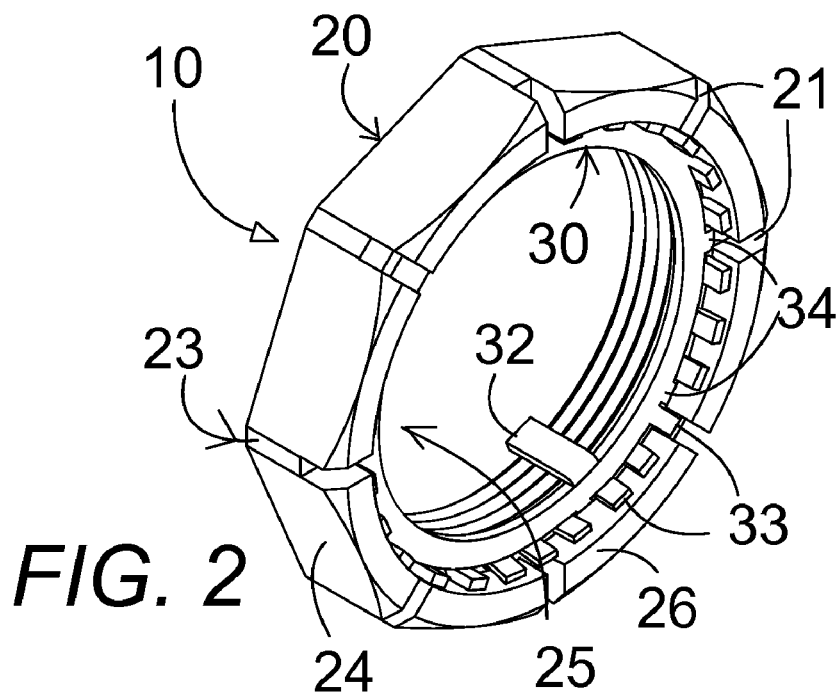
FIG. 2 is a perspective view of the assembled locking axle nut of the present invention.
Figure 3:
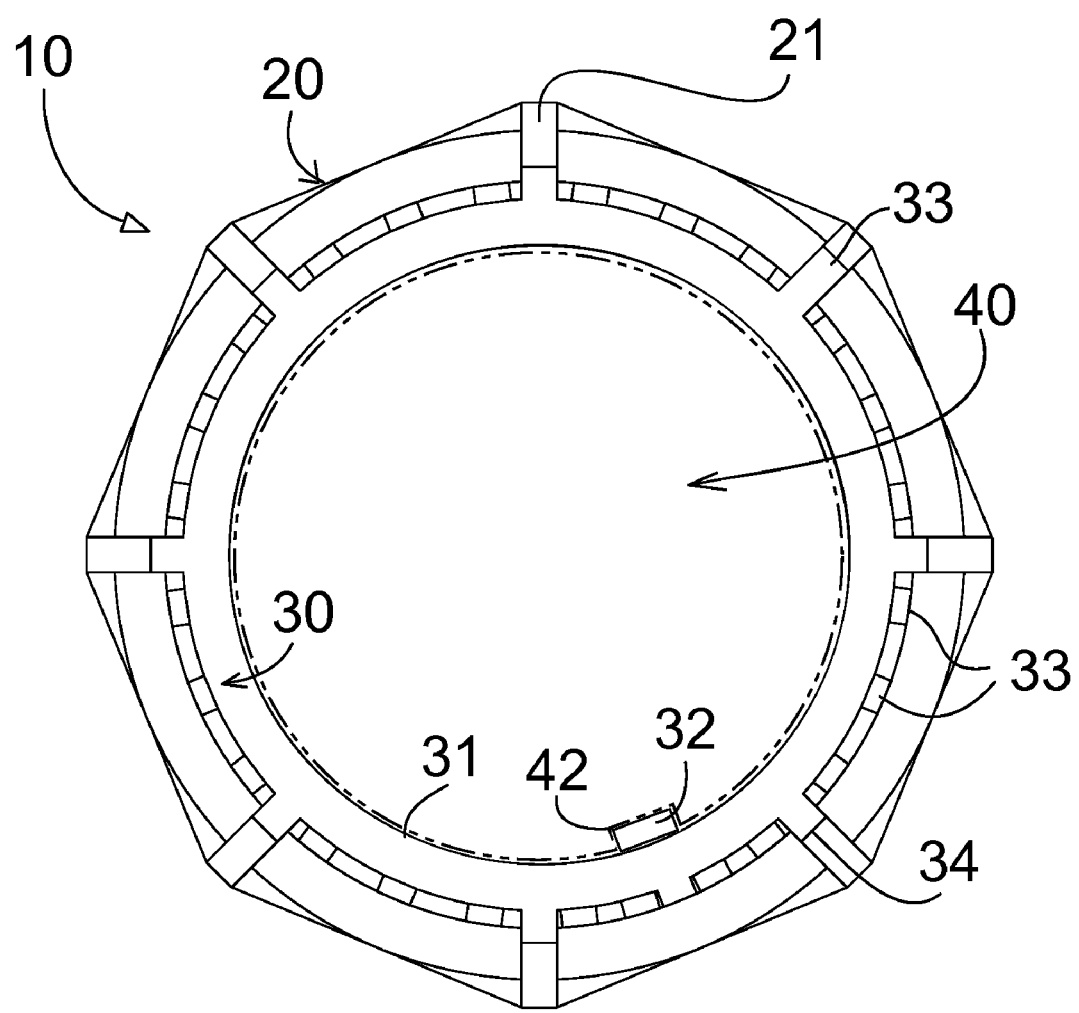
FIG. 3 is a top plan view of the assembled locking axle nut of the present invention.

In FIGS. 1-3, a locking axle nut device 10 comprises a castellated nut 20 and a locking insert 30 attached to the castellated nut.

The castellated nut 20 comprises an outer peripheral octagonal wall 23 for gripping by a tool to tighten and loosen the castellated nut and an interior opening 25 therethrough defined by a cylindrical interior wall 27 having interior threads 28 on a portion of the interior wall to mate with axle shaft threads of the axle shaft 40 on a vehicle. The castellated nut 20 has an interior annular groove 22 in the interior wall of the castellated nut adjacent to the interior threads 27. A series of spaced castellation slots 21 intrude into the castellated nut from a flat annular face 26 encircling a non-threaded end of the cylindrical opening extending into the interior annular groove.

The locking insert 30 attaches to the castellated nut 20 to form the locking axle nut device 10, as shown in FIGS. 2 and 3. The locking insert 30 comprises a flat annular ring 31 having a bendable axle-engaging tongue 32 protruding inwardly from the annular ring toward a center of the annular ring, as shown in FIG. 1. The axle-engaging tongue 32 is bent in over the interior threads 28, as shown in FIG. 2 so that the axle-engaging tongue 32 rides in a recessed axle groove 42 along the length of a threaded outer portion of the axle shaft 40 while the locking axle nut 10 is threaded onto the axle shaft 40.

A series of holding tabs 34, preferably eight, are evenly spaced around an outer perimeter of the annular ring and radiate outwardly therefrom. The holding tabs 34 fitting into the interior annular groove 22 of the castellated nut 20 so that the castellated nut rotates on the holding tabs while the castellated nut is threaded onto the axle shaft with the axle-engaging tongue in the axle groove preventing rotation of the locking insert.

A series of bendable spaced locking tabs 33 longer than the holding tabs radiate outwardly from the outer perimeter of the annular ring straddling the holding tabs 34. The locking tabs 33 are bent orthogonally to the annular ring while threading the locking axle nut onto the axle shaft 40, as shown in FIGS. 2 and 3, and one of the locking tabs 33 is bent into one of the castellation slots 21 to lock the locking axle nut device 10 in place after tightening the locking axle nut 10 onto the axle shaft 40. The locking tabs 33 are sufficient in number and spacing so that one of the locking tabs 33 will automatically align with one of the castellation slots 21 when the locking nut 10 is tightly threaded onto the axle shaft 40.

The castellated nut 20 preferably comprises eight evenly spaced castellation slots 21, each positioned at an intersection between two adjacent outer faces 24 of the peripheral octagonal wall 23. Each of the castellation slots 21 has a width sized to receive a locking tab 33 precisely fit into the castellation slot 21 to prevent movement of the locking tab 33 within the castellation slot 21. The annular ring 31 of the locking insert 30 preferably comprises twenty five locking tabs 33.

In use in FIGS. 1-3, to install the locking insert 10, all twenty-five locking tabs 33 are bent at 90 degrees up from the circular locking insert 31 and the axle-engaging tongue 32 is bent down at 90 degrees over the internal threads 28. The locking insert 20 is pressed into the nut and the small holding tabs 34 are bent into the groove 22 in the nut. The axle-engaging tongue 32 is then aligned with the axle groove 42 running along the length of the threaded axle shaft 40, as shown in FIG. 3. The locking axle nut 10 is then threaded onto the threaded axle shaft 40 with the axel-engaging tongue 32 sliding straight in the axle groove 42 with the outer wall 26 of the locking axle nut 10 facing out. The locking insert 30 moves straight onto the axle shaft 40 while the castellated nut 20 is turned around it to thread the castellated nut 20 onto the threaded axle shaft 40. Once the locking axle nut 10 is threaded on tightly, one of the locking tabs 33 is bent into one of the eight castellated slots 21 in the outer circular wall 26 of the castellated nut 20 to lock the castellated nut in place. No matter where the castellated nut 20 has turned relative to the locking insert, one locking tab 33 will always line up with the one of the eight castellated slots 21. The castellated nut 20 can no longer turn because the axle-engaging tongue 32 of the locking insert 30 is in the groove of the axle and the locking tab is in the slot of the nut and the nut cannot be turned to unthread.

It is understood that the preceding description is given merely by way of illustration and not in limitation of the invention and that various modifications may be made thereto without departing from the spirit of the invention as claimed.

What is claimed is:

1. A locking axle nut device comprising:
a castellated nut comprising an outer peripheral octagonal wall for gripping by a tool to tighten and loosen the castellated nut and an interior opening therethrough defined by a cylindrical interior wall having interior threads on a portion of the interior wall to mate with axle shaft threads on a vehicle, the castellated nut having an interior annular groove in the interior wall of the castellated nut adjacent to the interior threads; a series of spaced castellation slots intruding into the castellated nut from a flat annular face encircling a non-threaded end of the cylindrical opening extending into the interior annular groove;
a locking insert attached to the castellated nut to form a locking axle nut device, the locking insert comprising a flat annular ring having a bendable axle-engaging tongue protruding inwardly from the annular ring toward a center of the annular ring, the axle-engaging tongue bent in over the interior threads so that the axle-engaging tongue rides in a recessed axle groove along the length of a threaded outer portion of the axle shaft while the locking axle nut is threaded onto the axle shaft; a series of holding tabs evenly spaced around an outer perimeter of the annular ring and radiating outwardly therefrom, the holding tabs fitting into the interior annular groove of the castellated nut so that the castellated nut rotates on the holding tabs while the castellated nut is threaded onto the axle shaft with the axle-engaging tongue in the axle groove preventing rotation of the locking insert; and a series of bendable spaced locking tabs longer than the holding tabs radiating outwardly from the outer perimeter of the annular ring straddling the holding tabs, the locking tabs bent orthogonally to the annular ring while threading the locking axle nut onto the axle shaft and one of the locking tabs bent into one of the castellation slots to lock the locking axle nut device in place after tightening the axle nut onto the axle shaft, the locking tabs sufficient in number and spacing so that one of the locking tabs will automatically align with one of the castellation slots when the locking nut is tightly threaded onto the axle shaft.

2. The device of claim 1 wherein the castellated nut comprises eight evenly spaced castellation slots, each positioned at an intersection between two adjacent outer faces of the peripheral octagonal wall, each of the castellation slots having a width sized to receive a locking tab precisely fit into the castellation slot to prevent movement of the locking tab within the castellation slot.

3. The device of claim 2 wherein the annular ring of the locking insert comprises twenty five locking tabs.

\* \* \* \* \*